(12) United States Patent
Takahashi et al.

(10) Patent No.: US 9,954,370 B2
(45) Date of Patent: Apr. 24, 2018

(54) ELECTRICAL GRID CONTROL SYSTEM, ELECTRICAL GRID CONTROL METHOD, AND POWER CONVERSION APPARATUS

(71) Applicant: Hitachi, Ltd., Tokyo (JP)

(72) Inventors: Jun Takahashi, Tokyo (JP); Masashi Toyota, Tokyo (JP); Hiroshi Yatabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 14/884,146

(22) Filed: Oct. 15, 2015

(65) Prior Publication Data

US 2016/0118803 A1 Apr. 28, 2016

(30) Foreign Application Priority Data

Oct. 17, 2014 (JP) .................. 2014-212613

(51) Int. Cl.
| | |
|---|---|
| *H02J 3/38* | (2006.01) |
| *H02J 3/04* | (2006.01) |
| *H02J 3/12* | (2006.01) |
| *H02J 3/16* | (2006.01) |

(52) U.S. Cl.
CPC ............ *H02J 3/383* (2013.01); *H02J 3/04* (2013.01); *H02J 3/12* (2013.01); *H02J 3/16* (2013.01); *H02J 3/386* (2013.01); *Y02E 10/563* (2013.01); *Y02E 10/763* (2013.01); *Y02E 40/34* (2013.01)

(58) Field of Classification Search
None
See application file for complete search history.

(56) References Cited

U.S. PATENT DOCUMENTS

| | | | | |
|---|---|---|---|---|
| 2003/0090155 A1* | 5/2003 | Sanada | ............ | H02J 1/12 307/45 |
| 2004/0227521 A1* | 11/2004 | Higashihama | ....... | G01R 31/025 324/522 |
| 2006/0018399 A1* | 1/2006 | Miyazakii | ............ | H04B 3/54 375/295 |
| 2008/0277938 A1* | 11/2008 | Oohara | ............ | F03D 7/0224 290/44 |

(Continued)

FOREIGN PATENT DOCUMENTS

JP 2013-183622 A 9/2013

*Primary Examiner* — Tuan Dao
(74) *Attorney, Agent, or Firm* — Mattingly & Malur, PC

(57) ABSTRACT

An electrical grid control system includes a plurality of power conversion apparatuses each storing active power relationship information indicating a relationship between an active power control level representing a level of control for active power output to an electrical grid, and a connection point frequency being a frequency at a connection point to the electrical grid; and a control apparatus that repeatedly receives information indicating a system frequency measured in the electrical grid, determines the active power control level based on the system frequency, and transmits the active power control level to the plurality of power conversion apparatuses. Each power conversion apparatus repeatedly measures the connection point frequency, receives the active power control level from the control apparatus, and controls the active power based on the measured connection point frequency, the received active power control level, and the active power relationship information.

11 Claims, 22 Drawing Sheets

(56) References Cited

U.S. PATENT DOCUMENTS

| | | | | |
|---|---|---|---|---|
| 2011/0175443 A1* | 7/2011 | Koyanagi | ............... | H02J 3/32 307/21 |
| 2011/0264289 A1* | 10/2011 | Sawyer | ............ | H01L 31/02021 700/287 |
| 2012/0249010 A1* | 10/2012 | Hollingsworth | ... | H05B 41/2806 315/248 |

* cited by examiner

FIG. 4

Actual data storage table 540

Power distribution system measurement table 541

| Actual data transmission source | Voltage | Frequency |
|---|---|---|
| Substation | - | 60.0Hz |
| D0001 | 202.1V | - |
| D0002 | 202.3V | - |
| D0003 | 200.5V | - |

PCS measurement table 542

| Actual data transmission source | Active power | Reactive power | Voltage |
|---|---|---|---|
| P0001 | 6.0kW | 0.6kVar | 202.0V |
| P0002 | 2.3KW | 0.2kVar | 202.2V |
| P0003 | 7.2kW | 0.3kVar | 202.1V |
| ... | ... | ... | ... |

PCS management table 550

| PCS name | Data collection apparatus name | Frequency-output reduction control level | Voltage-reactive power control level |
|---|---|---|---|
| P0001 | D0001 | 0 | 1 |
| P0002 | D0001 | 0 | 1 |
| P0003 | D0001 | 0 | 1 |
| P0004 | D0002 | 0 | 2 |
| P0005 | D0002 | 0 | 2 |
| P0006 | D0003 | 0 | 3 |
| P0007 | D0003 | 0 | 3 |
| P0008 | D0003 | 0 | 3 |

FIG. 6

Control pattern management table 460

Predetermined frequency range table 461

| Predetermined frequency upper limit value [Hz] |
| --- |
| 60.5 |

Target frequency range table 462

| Frequency-output reduction control level | Target frequency upper limit value [Hz] |
| --- | --- |
| 1 | 60.3 |
| 2 | 60.2 |
| 3 | 60.1 |

Predetermined voltage range table 463

| Predetermined voltage lower limit value [%] | Predetermined voltage upper limit value [%] |
| --- | --- |
| 88 | 110 |

Target frequency range table 464

| Voltage-reactive power control level | Target voltage lower limit value [%] | Target voltage upper limit value [%] |
| --- | --- | --- |
| 1 | 94 | 109 |
| 2 | 95 | 108 |
| 3 | 96 | 107 |

Control level table 465

| Frequency-output reduction control level | Voltage-reactive power control level |
| --- | --- |
| 0 | 1 |

ELECTRICAL GRID CONTROL SYSTEM, ELECTRICAL GRID CONTROL METHOD, AND POWER CONVERSION APPARATUS

FIELD

The present invention relates to a technique of controlling an electrical grid.

BACKGROUND

Recent active introduction of renewable energy, such as photovoltaics (PV: solar power generation) and wind power generation, has resulted in sharp increase in a reverse current causing problems in a system such as frequency fluctuation (lack of back up capacity in the system) and voltage rise, especially in islands where a grid is small. Due to such problems, an application for the PV connection might take time or installation of the PV might not even be permitted.

Countermeasures to address such problems include reducing an output from the PV or even stopping the output from the PV for a predetermined period of time when a frequency or voltage of a power distribution system increases. In recent years, a system that cooperates with higher level systems to address the problems has been proposed.

In an automatic power distribution system in disclosed in PTL 1, a dispersed power source (PV) is connected with a power distribution line through a smart meter, and a voltage value at a node at which the dispersed power source is connected with the power distribution line and a voltage value of a power distribution substation are collected, and an amount of power that is transmitted to the power distribution line and measured by the smart meter is collected through a meter data management system. When the voltage value at the node exceeds a voltage target value, the automatic power distribution system calculates a reactive power control amount by using the voltage value at the node, a voltage value of a power distribution substation, the voltage target value, a power amount acquired by the smart meter, and a power distribution line impedance of the node. Then the automatic power distribution system transmits a command value indicating the reactive power control amount distributed to the dispersed power sources to the smart meter through a meter data management system, and thus controls the reactive power of a solar light inverter.

CITATION LIST

Patent Literature

[PTL 1] Japanese Patent Application Laid-open No. 2013-183622

The automatic power distribution system described above transmits the reactive power control amount to the inverter to control the inverter. Thus, the automatic power distribution system and the inverter need to communicate at a short time interval, and thus a large amount of communications is required. As a result, due to an increase in a load on the automatic power distribution system and a communication path, the inverter might not be able to be controlled.

SUMMARY

The present invention is made in view of the above problem, and an object of the present invention is to provide a technique of reducing an amount of communications performed between a control apparatus and a power conversion apparatus.

To solve the above problem, an electrical grid control system according to an aspect of the present invention includes a plurality of power conversion apparatuses each connected with an electrical grid, converting DC power from a power source into AC power, outputting the AC power to the electrical grid, and storing active power relationship information indicating a relationship between an active power control level representing a level of control for active power output to the electrical grid and a connection point frequency, which is a frequency at a connection point to the electrical grid, and a control apparatus that repeatedly receives information indicating a system frequency as a frequency of power measured in the electrical grid, determines the active power control level based on the system frequency, and transmits the active power control level to the plurality of power conversion apparatuses. Each of the plurality of power conversion apparatuses repeatedly measures the connection point frequency, receives the active power control level from the control apparatus, and controls the active power based on the measured connection point frequency, the received active power control level, and the active power relationship information.

BRIEF DESCRIPTION OF THE DRAWINGS

FIG. 4 illustrates an actual data storage table 540.

FIG. 6 illustrates a control pattern management table 460.

DESCRIPTION OF EMBODIMENT

An embodiment of the present invention is described below with reference to the drawings.

Figure 1:
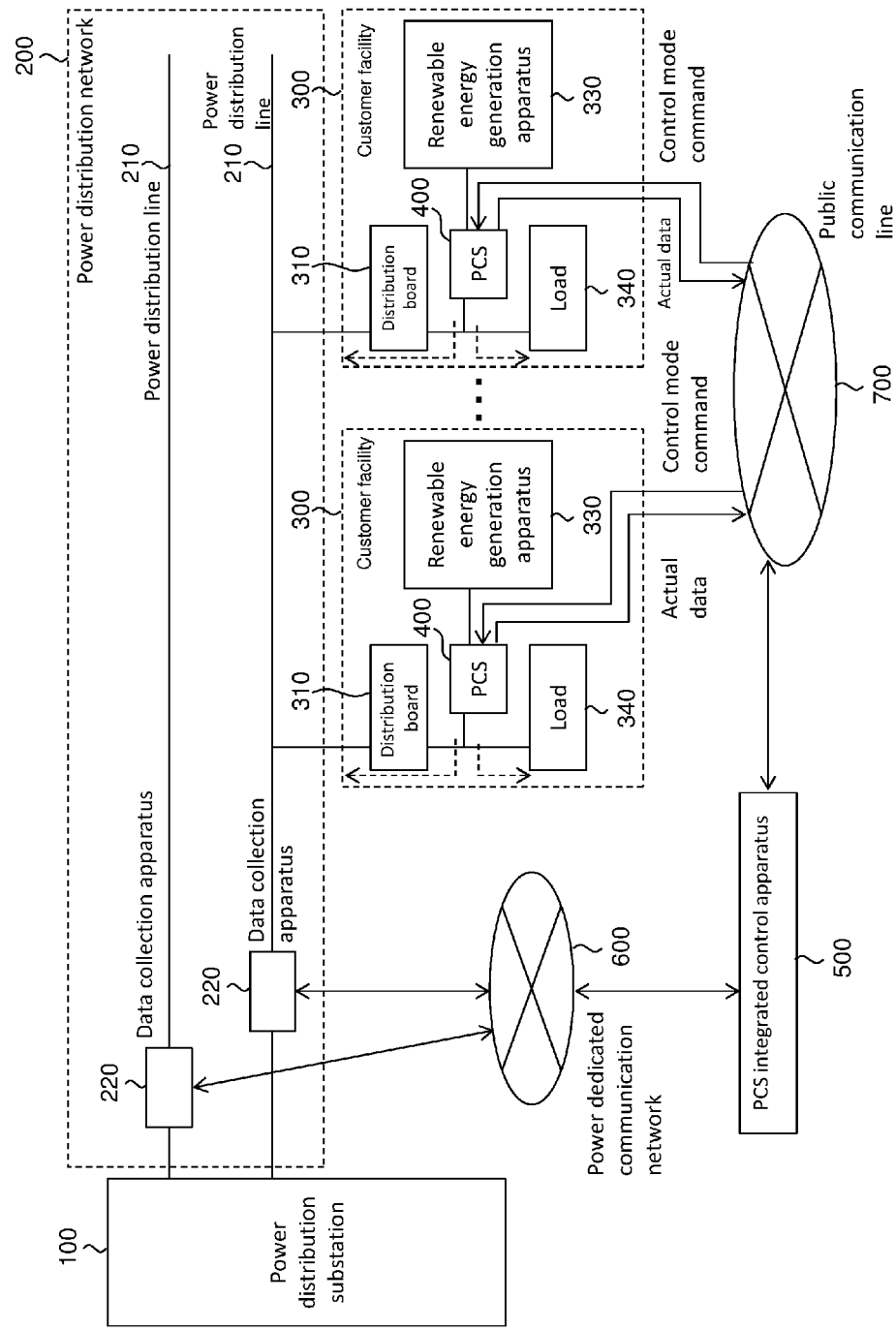
FIG. 1 is a diagram illustrating a configuration of a power distribution system according to an embodiment of the present invention.

FIG. 1 illustrates a configuration of a power distribution system according to the embodiment of the present invention.

A power distribution system control system according to the present embodiment controls the power distribution system. The power distribution system includes a power distribution substation 100, a power distribution network 200, and customer facilities 300. The power distribution network 200 includes a plurality of power distribution lines 210. A data collection apparatus 220 is provided on the power distribution line 210. The data collection apparatus 220 measures voltage of the power distribution line 210. For example, the data collection apparatus 220 is a sensor that is provided on a pole transformer, and measures secondary voltage of the pole transformer. A plurality of the customer facilities 300 are connected to the power distribution line 210 on the downstream side of the data collection apparatus 220. The customer facility 300 includes a distribution board 310, a power conditioning system (PCS) 400, a renewable energy power generation apparatus 330, and a load 340. The distribution board 310 is connected to the power distribution line 210, and supplies power from the power distribution line 210 to the load 340 and power from the PCS 400 to the power distribution line 210. The renewable energy power generation apparatus 330 generates DC power by using renewable energy. The renewable energy power generation apparatus 330 is a solar power generation apparatus, a wind power generation apparatus, or the like. The PCS 400 converts the DC power from the renewable energy power generation apparatus 330 into AC power. The load 340 consumes the power from the distribution board 310 or the PCS 400, and is an illumination lamp, an air conditioner, or the like.

The power distribution system control system includes a PCS integrated control apparatus 500 and a plurality of the PCSs 400. The PCS integrated control apparatus 500 is connected to the power distribution substation 100 and the data collection apparatus 220 through a power-dedicated communication line 600, and is connected to the plurality of PCSs 400 through a public communication line 700. The PCS integrated control apparatus 500 may be provided in a distribution management system (DMS), an energy management system (EMS), or the like. The power-dedicated communication line 600 and the public communication line 700 may be the same communication line.

The power distribution substation 100 measures a frequency and the like of the power distribution line 210, and transmits a measurement value thus obtained to the PCS integrated control apparatus 500. The data collection apparatus 220 measures voltage and the like and transmits a measurement value thus obtained to the PCS integrated control apparatus 500. The PCS 400 measures output active power, reactive power, voltage, and the like, and transmits measurement values thus obtained to the PCS integrated control apparatus 500. Based on the measurement values from the power distribution substation 100 and the data collection apparatus 220, the PCS integrated control apparatus 500 determines a control level, indicating a magnitude of a range to be controlled in accordance with a state of a connection point of each PCS 400, and transmits a command indicating the control level to the PCS 400. The PCS 400 controls the power to the power distribution line in accordance with a control pattern corresponding to the control level.

The control pattern includes: a frequency-output reduction control pattern defining output reduction in accordance with a frequency; and a voltage-reactive power control pattern defining reactive power control in accordance with voltage. The control pattern is designated with the control level. The frequency-output reduction control pattern is designated with a frequency-output reduction control level. The voltage-reactive power control pattern is designated with a voltage-reactive power control level. A higher frequency-output reduction control level leads to a larger range of frequencies for which the output reduction is executed. A higher voltage-reactive power control level leads to a larger range of voltage for which the reactive power control is executed.

A configuration of the power distribution system control system is described below.

Figure 2:
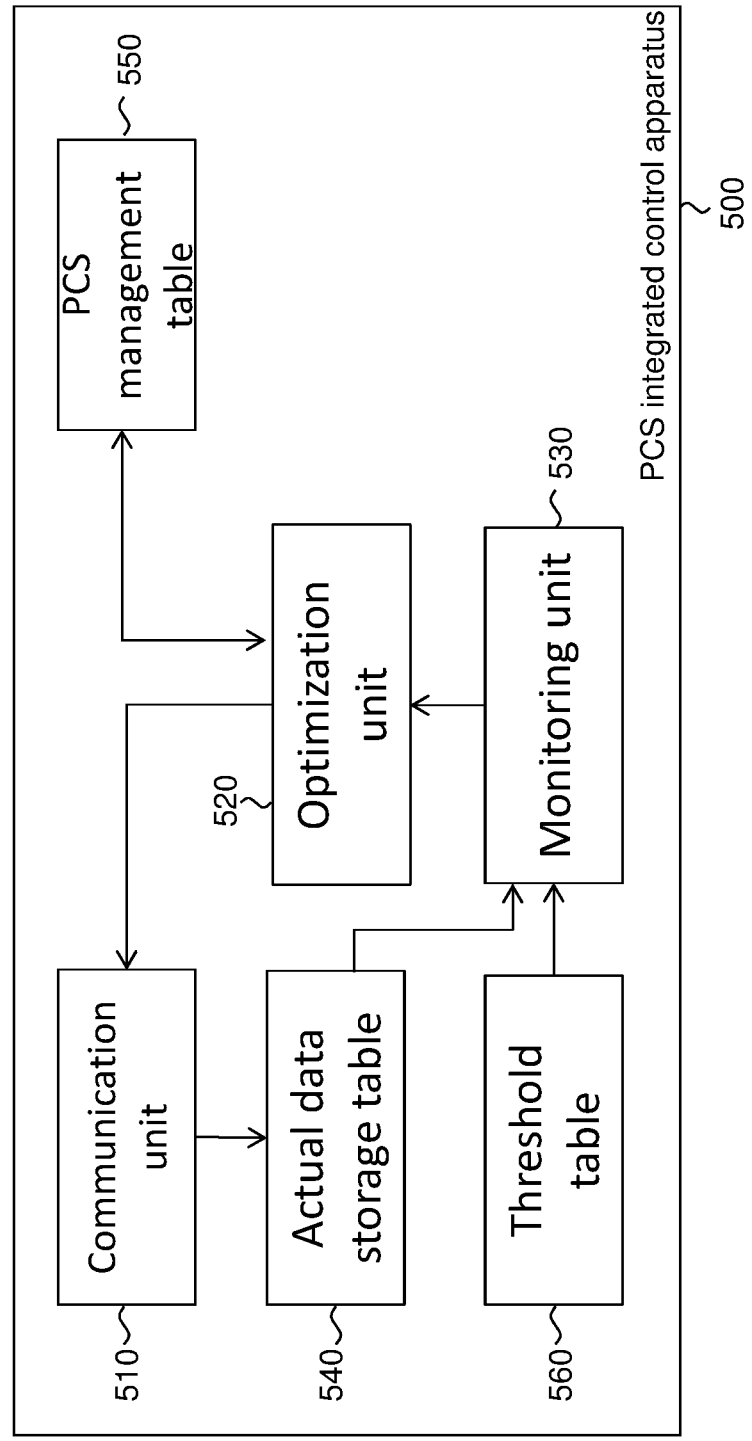
FIG. 2 illustrates a configuration of a PCS integrated control apparatus 500.

FIG. 2 illustrates a configuration of the PCS integrated control apparatus 500.

The PCS integrated control apparatus 500 includes a communication unit 510, an optimization unit 520, a monitoring unit 530, an actual data storage table 540, a PCS management table 550, and a threshold table 560.

The communication unit 510 is connected to and communicates with the power distribution substation 100 and the data collection apparatus 220, and is further connected to and communicates with the PCS 400.

The actual data storage table 540 stores the measurement values received through the communication unit 510 from the power distribution substation 100, the data collection apparatus 220, and the PCS 400. The PCS management table 550 stores information for managing the PCS 400. The threshold table 560 stores a threshold for determining a frequency and voltage of the power distribution system. For example, the threshold table 560 stores a prescribed frequency range and a prescribed voltage range. The prescribed frequency range is defined by a prescribed frequency lower limit value and a prescribed frequency upper limit value. The prescribed frequency lower limit value is lower than a frequency reference value as a reference value set in advance for the frequency of the power distribution system. The prescribed frequency upper limit value is higher than the frequency reference value. For example, the prescribed frequency lower limit value is a value obtained by adding a predetermined margin to a frequency lower limit value determined by a power company or by law. For example, the prescribed frequency upper limit value is a value obtained by subtracting the predetermined margin from a frequency upper limit value determined by a power company or by law. The prescribed voltage range is defined by a prescribed voltage lower limit value and a prescribed voltage upper limit value. The prescribed voltage lower limit value is lower than a voltage reference value as a reference value set in advance for voltage of the power distribution system. The prescribed voltage upper limit value is higher than the voltage reference value. For example, the prescribed voltage lower limit value is a value obtained by adding a predetermined margin to a voltage lower limit value determined by a power company or by law. For example, the prescribed voltage upper limit value is a value obtained by subtracting the predetermined margin from a voltage upper limit value determined by a power company or by law.

The monitoring unit 530 monitors the frequency and the voltage of the power distribution system based on the actual data storage table 540. The optimization unit 520 determines the control level based on a monitoring result obtained by the monitoring unit 530.

The PCS integrated control apparatus 500 may be implemented by a computer including a central processing unit (CPU), a memory, and the communication unit 510. In this case, the memory stores the actual data storage table 540, the PCS management table 550, the threshold table 560, and a program. The program causes the CPU to function as the optimization unit 520 and the monitoring unit 530. The program may be stored in a computer readable storage medium and read by the CPU.

The PCS integrated control apparatus 500 may be connected to a display apparatus and an input apparatus. The PCS integrated control apparatus 500 may cause the display apparatus to display information on any one of the actual data storage table 540, the PCS management table 550, and the threshold table 560. Thus, a manager of the PCS integrated control apparatus 500 can check the control level of each PCS 400, and recognize the state of the current output reduction and reactive power control.

Figure 3:
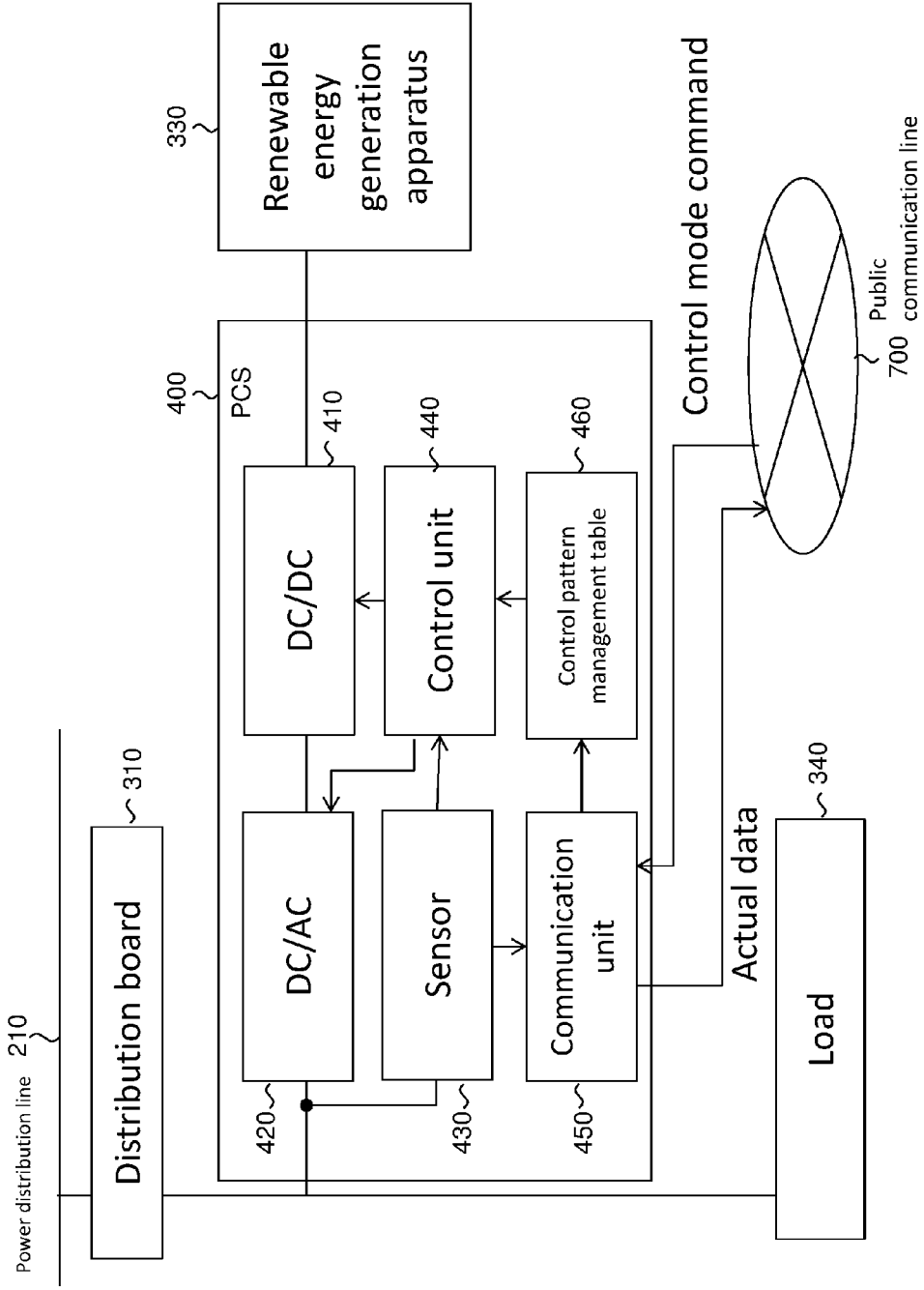
FIG. 3 illustrates a configuration of a PCS 400.

FIG. 3 illustrates a configuration of the PCS 400.

The PCS 400 includes a DC/DC converter 410, a DC/AC inverter 420, a sensor 430, a control unit 440, a communication unit 450, and a control pattern management table 460.

The DC/DC converter 410 is connected to the renewable energy power generation apparatus 330, controls the voltage of the renewable energy power generation apparatus 330, and supplies boosted voltage to the DC/AC inverter 420. The DC/AC inverter 420 is connected to the DC/DC converter 410, converts DC power output from the DC/DC converter 410 into AC power, and outputs the AC power to the load 340 and the distribution board 310. The sensor 430 measures active power, reactive power, voltage, frequency, and the like at a connection point between the DC/AC inverter 420 and the power distribution line 210. Hereinafter, the frequency measured by the sensor 430 will be referred to as a connection point frequency, and the voltage measured by the sensor 430 will be referred to as connection point voltage. The control unit 440 controls the DC/DC converter 410 and the DC/AC inverter 420 based on the measurement result obtained by the sensor 430 and the control pattern management table 460. The communication unit 450 is connected to the public communication line 700, transmits the measurement result obtained by the sensor 430 to the PCS integrated control apparatus 500, and receives a command from the PCS integrated control apparatus 500. The control pattern management table 460 stores a set value for a predetermined control pattern for each control level.

The control unit 440 and the control pattern management table 460 may be implemented by a computer including a CPU and a memory. In this case, the memory stores the control pattern management table 460 and a program. The program causes the CPU to function as the control unit 440. The program may be stored in a computer readable storage medium and read by the CPU.

FIG. 4 illustrates the actual data storage table 540.

The actual data storage table 540 includes a power distribution system measurement table 541 and a PCS measurement table 542.

The power distribution system measurement table 541 includes an entry for each measurement value transmission source. An entry corresponding to one transmission source includes: an actual data transmission source name as an identifier of the transmission source; voltage measured by the transmission source; and a frequency measured by the transmission source. Each entry may include one of the voltage and the frequency. For example, an entry with the power distribution substation 100 as the transmission source includes the frequency measured by the power distribution substation 100. An entry with the data collection apparatus 220 as the transmission source includes the voltage measured by the data collection apparatus 220. Still the data collection apparatus 220 may also measure the frequency.

The PCS measurement table 542 includes an entry for each PCS 400 as the transmission source of the measurement value. An entry corresponding to one transmission source includes: an actual data transmission source name as an identifier of the transmission source; active power measured by the transmission source; reactive power measured by the transmission source; and voltage measured by the transmission source.

Figure 5:
FIG. 5 illustrates a PCS management table 550.

FIG. 5 illustrates the PCS management table 550.

The PCS management table 550 includes an entry for each PCS 400. An entry corresponding to one PCS 400 includes: a PCS name as an identifier of the PCS; a data collection apparatus name as an identifier of the data collection apparatus 220 on the upstream side of the PCS on the power distribution line 210; the frequency-output reduction control level of the PCS; and the voltage-reactive power control level of the PCS.

In the present embodiment, the frequency-output reduction control level and the voltage-reactive power control level each indicates any one of 0, 1, 2, and 3. More specifically, the frequency-output reduction control level upper limit value, as the upper limit value of the frequency-output reduction control level, is 3, and the voltage-reactive power control level upper limit value, as the upper limit value of the voltage-reactive power control level, is 3. An initial value of the frequency-output reduction control level of each PCS is 0. With this value the PCS does not execute the output reduction in accordance with the frequency. The PCS having the frequency-output reduction control level set to 1 or higher executes the output reduction in accordance with the frequency. An initial value of the voltage-reactive power control level of each PCS is 0. With this value the PCS does not execute the reactive power control in accordance with the voltage. The PCS having the voltage-reactive power control level set to 1 or higher executes the reactive power control in accordance with the voltage.

FIG. 6 illustrates the control pattern management table 460.

The control pattern management table 460 includes a prescribed frequency range table 461, a target frequency range table 462, a prescribed voltage range table 463, a target voltage range table 464, and a control level table 465. The target frequency range is defined by a target frequency upper limit value. The target voltage range is defined by a target voltage lower limit value and a target voltage upper limit value.

The prescribed frequency range table 461 includes the prescribed frequency upper limit value. The target frequency range table 462 includes an entry for each frequency-output reduction control level. An entry for one frequency-output reduction control level includes the frequency-output reduction control level and the target frequency upper limit value. The target frequency upper limit value is higher than the frequency reference value and is lower than the prescribed frequency upper limit value.

The prescribed voltage range table 463 includes the prescribed frequency lower limit value and the prescribed frequency upper limit value. The target frequency range table 462 includes an entry for each voltage-reactive power control level. An entry for one voltage-reactive power control level includes the voltage-reactive power control level, the target voltage lower limit value, and the target voltage upper limit value. The target voltage lower limit value is higher than the prescribed voltage lower limit value and lower than the voltage reference value. The target voltage upper limit value is higher than the voltage reference value and lower than the prescribed voltage upper limit value.

The control level table 465 stores the frequency-output reduction control level and the voltage-reactive power control level set for the PCS 400.

The control pattern management table 460 may be information that has been input for the PCS 400 in advance, or may be information input to the PCS integrated control apparatus 500 and transmitted to the PCS 400.

An operation of determining the control level performed by the PCS integrated control apparatus 500 is described below.

In the PCS integrated control apparatus 500, the optimization unit 520 executes system frequency optimization processing of optimizing the frequency of the power distribution network 200, and power distribution line voltage optimization processing of optimizing the voltage for each power distribution line 210, at a predetermined time interval that is several seconds to several tens of seconds for example. The size of a region controlled by the system frequency optimization processing and the size of a region controlled by the power distribution line voltage optimization processing are different from each other.

Figure 7:
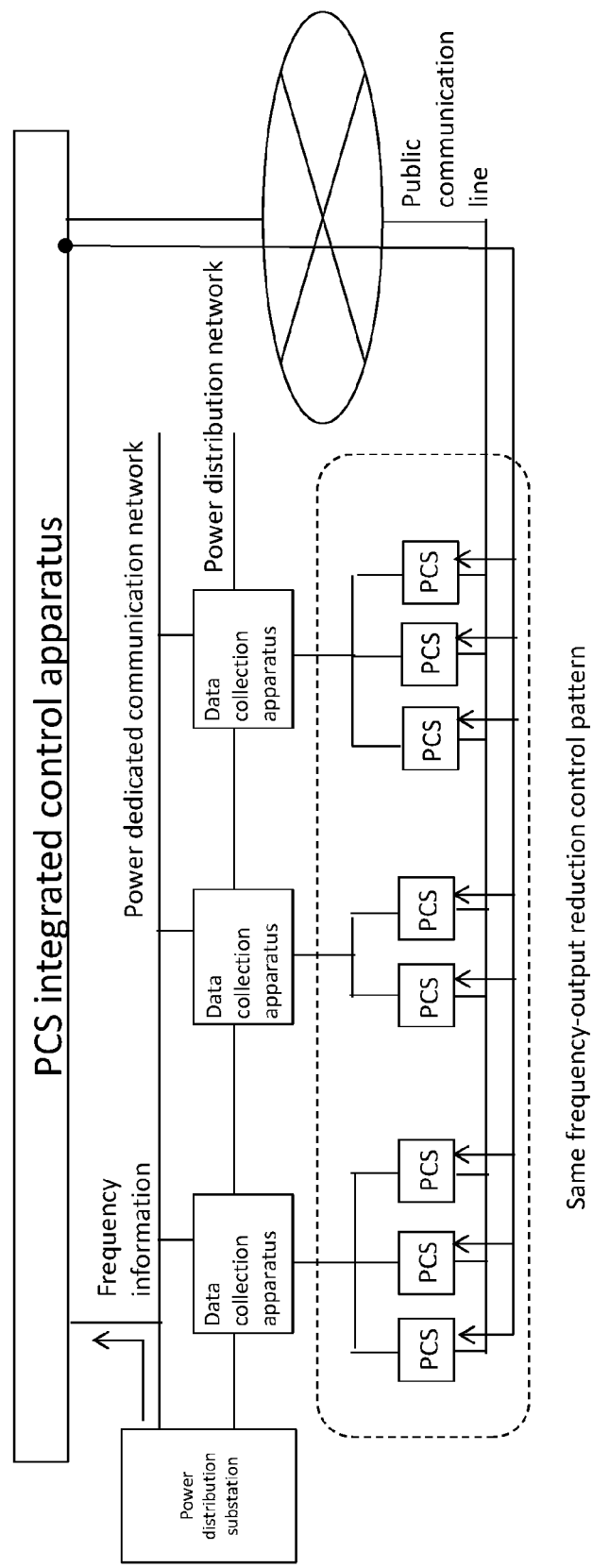
FIG. 7 illustrates a region controlled by system frequency optimization processing.

FIG. 7 illustrates the region controlled by the system frequency optimization processing.

In the system frequency optimization processing, based on a system frequency measurement value as the frequency measured by the power distribution substation 100, the optimization unit 520 sets the same frequency-output reduction control level to all the PCSs 400 that can communicate with the PCS integrated control apparatus 500. Thus, the PCS integrated control apparatus 500 can control the frequency of the power distribution system.

Figure 8:
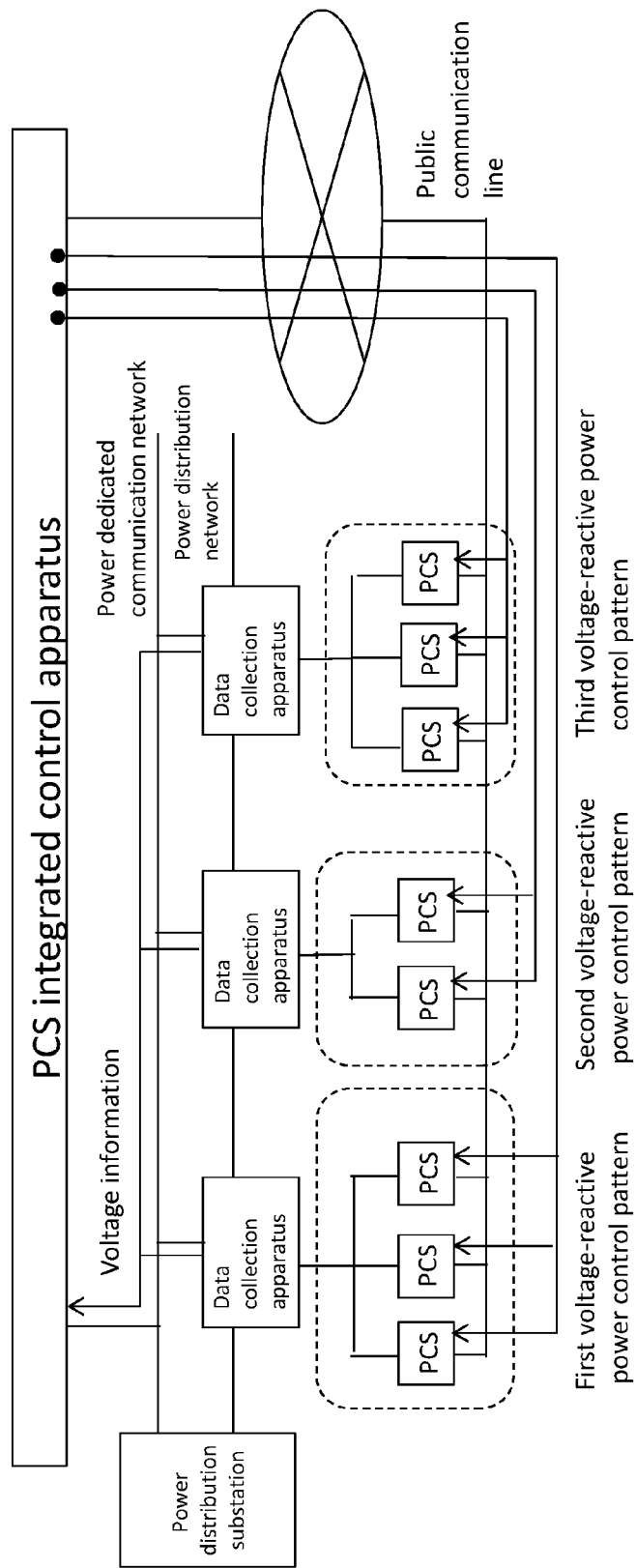
FIG. 8 illustrates a region controlled by power distribution line voltage optimization processing.

FIG. 8 illustrates the region controlled by the power distribution line voltage optimization processing.

In the power distribution line voltage optimization processing, based on the voltage measured by one data collection apparatus, the optimization unit 520 performs the voltage-reactive power control for the PCSs 400 that can communicate with the PCS integrated control apparatus 500 in the PCSs 400 corresponding to the power distribution line of the data collection apparatus. Thus, the PCS integrated control apparatus 500 can control the voltage for each power distribution line of the data collection apparatus.

Figure 9:
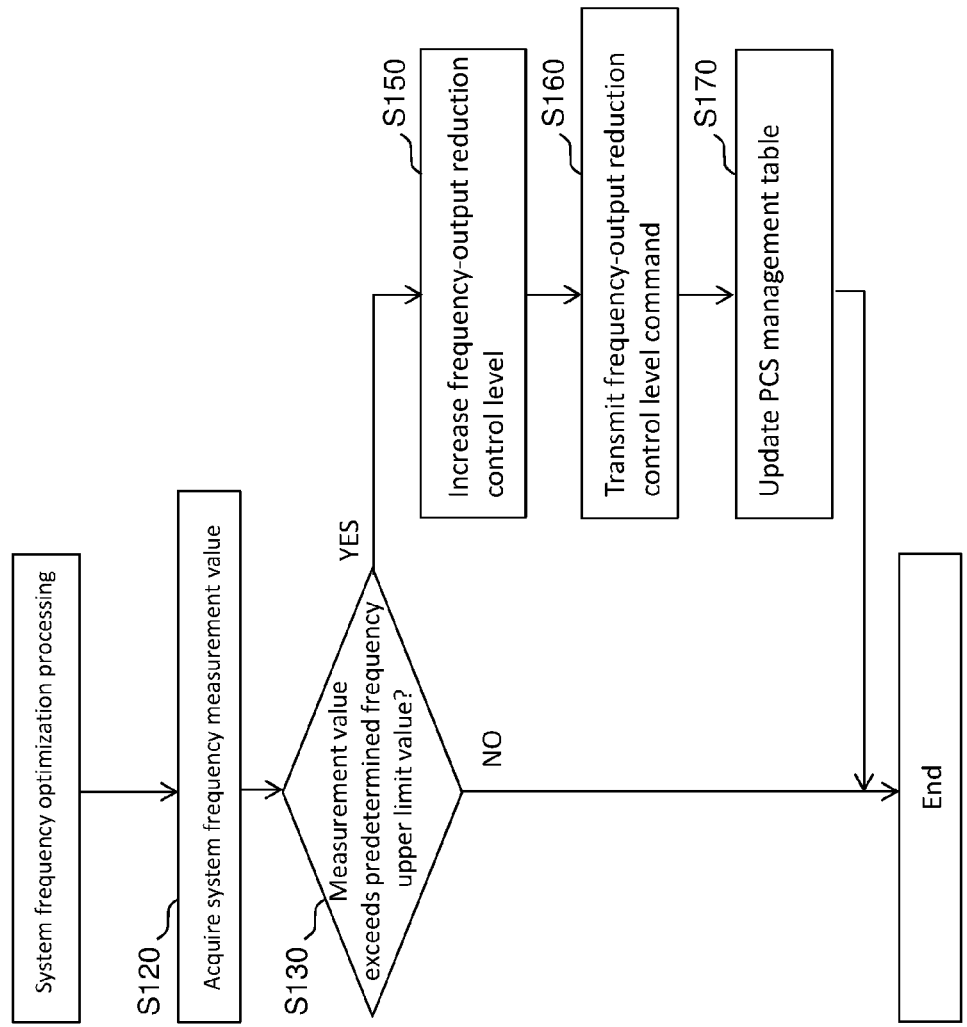
FIG. 9 illustrates the system frequency optimization processing.

FIG. 9 illustrates the system frequency optimization processing.

In S120, the optimization unit 520 acquires the system frequency measurement value from the actual data storage table 540. Then, in S130, the optimization unit 520 determines whether the system frequency measurement value exceeds the prescribed frequency upper limit value.

When it is determined that the system frequency measurement value does not exceed the prescribed frequency upper limit value, the optimization unit 520 terminates the flow.

When it is determined that the system frequency measurement value exceeds the prescribed frequency upper limit value, the optimization unit 520 increments the frequency-output reduction control level by one in S150. In the processing, when the frequency-output reduction control level before being changed is at the maximum value, the optimization unit 520 does not change the frequency-output reduction control level. Then, in S160, the optimization unit 520 transmits a frequency-output reduction control level command indicating the changed frequency-output reduction control level to all the PCSs 400. Then, in S170, the optimization unit 520 sets the changed frequency-output reduction control level in the entries for all the PCSs 400 in the PCS management table 550, and terminates the flow.

When it is determined that the system frequency measurement value exceeds the prescribed frequency upper limit value in S130, the optimization unit 520 may count the number of times such a state is consecutively determined. In this case, the optimization unit 520 moves the processing to S150 when the number of times exceeds a predetermined number of times and terminates the flow when the number of times does not exceed the predetermined number of times. The optimization unit 520 can perform the determination in S130 through this statistical processing. Thus, the frequency-output reduction control level can be prevented from changing due to a temporary fluctuation of the measurement value.

With the system frequency optimization processing described above, the PCS integrated control apparatus 500 can increase the frequency-output reduction control level for all the PCSs 400 when the system frequency measurement value exceeds the prescribed frequency upper limit value. Thus, the level of the output reduction can be gradually increased.

Figure 10:
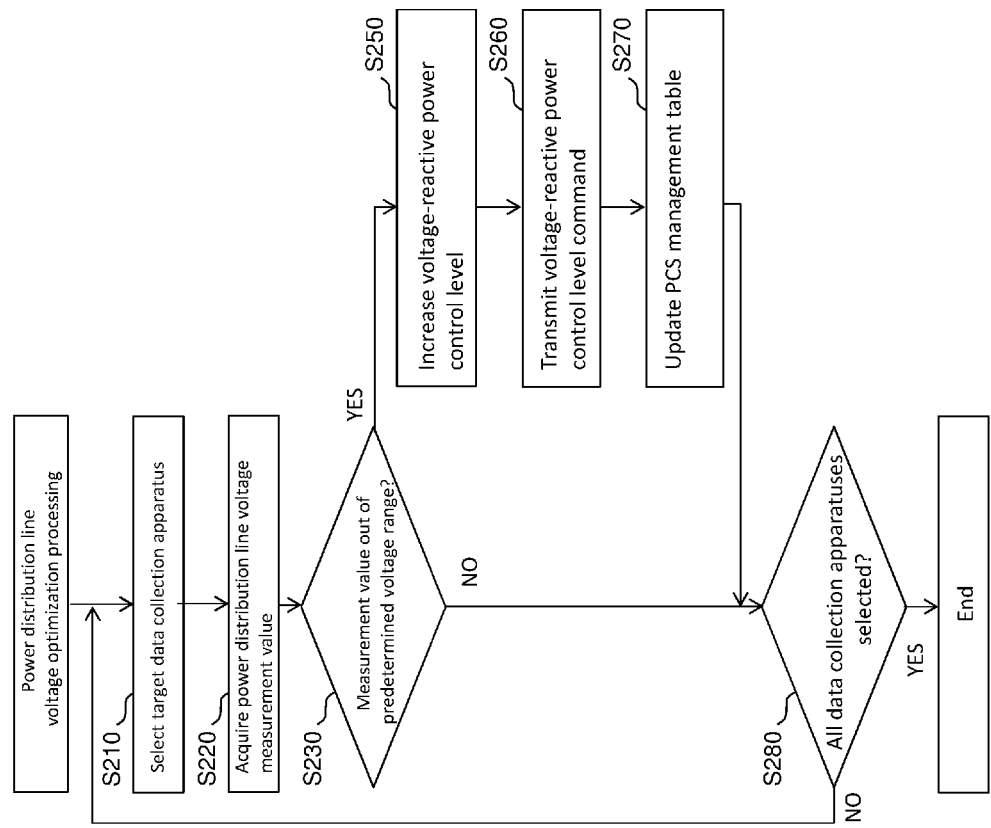
FIG. 10 illustrates the power distribution line voltage optimization processing.

FIG. 10 illustrates the power distribution line voltage optimization processing.

In S210, the optimization unit 520 selects one data collection apparatus 220 as a target data collection apparatus based on the power distribution system measurement table 541 in the actual data storage table 540. Then, the optimization unit 520 selects as a target PCS the PCS 400 corresponding to the power distribution line of the target data collection apparatus, based on the PCS management table 550. Then, in S220, the optimization unit 520 acquires the power distribution line voltage measurement value, as voltage measured by the target data collection apparatus, from the power distribution system measurement table 541 in the actual data storage table 540. Then, in S230, the optimization unit 520 determines whether the power distribution line voltage measurement value is out of the prescribed voltage range. In this processing, the optimization unit 520 determines that the power distribution line voltage measurement value is out of the prescribed voltage range, when the power distribution line voltage measurement value is higher than the prescribed voltage upper limit or lower than the prescribed voltage lower limit value.

When it is determined that the power distribution line voltage measurement value is within the prescribed voltage range, the optimization unit 520 moves the processing to S280.

When it is determined that the power distribution line voltage measurement value is out of the prescribed voltage range, in S250, the optimization unit 520 increments the voltage-reactive power control level of the target PCS stored in the PCS management table 550 by one. In this processing, when the voltage-reactive power control level of the target PCS stored in the PCS management table 550 is at the voltage-reactive power control level upper limit value, the optimization unit 520 does not change the voltage-reactive power control level. Then, in S260, the optimization unit 520 transmits a voltage-reactive power control level command indicating the changed voltage-reactive power control level to the target PCS. Then, in S270, the optimization unit 520 sets the changed voltage-reactive power control level to the entry for the target PCS in the PCS management table 550, and moves the processing to S280.

In S280, the optimization unit 520 determines whether all the data collection apparatuses 220 have been selected. When it is determined that there is an unselected data collection apparatus 220 (No), the optimization unit 520 moves the processing to S210, and selects the next target data collection apparatus and target PCS. When it is determined that all the data collection apparatus 220 have been selected (Yes), the optimization unit 520 terminates the flow.

As in S130 described above, when it is determined that the power distribution line voltage measurement value exceeds the prescribed voltage upper limit value in S230, the optimization unit 520 may count the number of times such a state is consecutively determined. In this case, the optimization unit 520 moves the processing to S250 when the number of times exceeds a predetermined number of times and terminates the flow when the number of times does not exceed the predetermined number of times. The optimization unit 520 can perform the determination in S230 through this static processing. Thus, the output reduction due to the temporary fluctuation of the measurement value can be prevented.

With the power distribution line voltage optimization processing described above, the PCS integrated control apparatus 500 can increment the voltage-reactive power control level of the PCS corresponding to the power distribution line of the target data collection apparatus, when the power distribution line voltage measurement value, measured by the target data collection apparatus, falls out of the prescribed voltage range. Thus, the PCS integrated control apparatus 500 can gradually increase the level of the control on the reactive power.

The PCS integrated control apparatus 500 may execute the power distribution line voltage optimization processing after the system frequency optimization processing.

An operation of determining the control level performed by the PCS 400 is described below.

Here, a case is described where the communicate with the PCS integrated control apparatus 500 cannot be established, because the PCS 400 is not connected to the PCS integrated control apparatus 500 or due to a failure of the PCS integrated control apparatus 500 or the public communication line 700. In this case, the control unit 440 of the PCS 400 periodically executes connection point frequency optimization processing of optimizing the frequency at the connection point and connection point voltage optimization processing of optimizing the voltage at the connection point, instead of receiving the command from the PCS integrated control apparatus 500.

Figure 11:
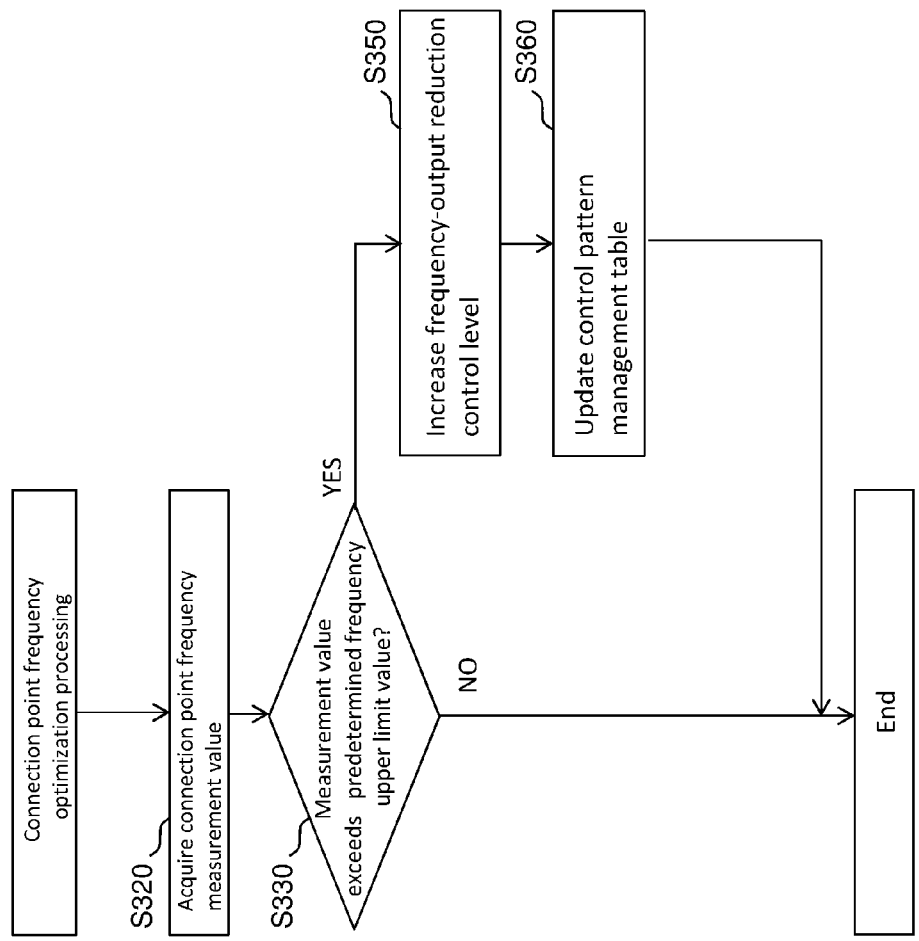
FIG. 11 illustrates connection point frequency optimization processing.

FIG. 11 illustrates the connection point frequency optimization processing.

In S320, the control unit 440 acquires an connection point frequency measurement value as a frequency measured by the sensor 430. In S330, the control unit 440 determines whether the connection point frequency measurement value exceeds the prescribed frequency upper limit value.

When it is determined that the connection point frequency measurement value does not exceed the prescribed frequency upper limit value, the control unit 440 terminates the flow.

When it is determined that the connection point frequency measurement value exceeds the prescribed frequency upper limit value, in S350, the control unit 440 acquires the frequency-output reduction control level stored in the control pattern management table 460, and increments the frequency-output reduction control level by one. In this processing, when the frequency-output reduction control level stored in the control pattern management table 460 is at the frequency-output reduction control level upper limit value, the control unit 440 does not change the frequency-output reduction control level. Then, in S360, the control unit 440 writes the changed frequency-output reduction control level to the control pattern management table 460, and terminates the flow.

With the connection point frequency optimization processing described above, the PCS 400 that cannot communicate with the PCS integrated control apparatus 500 can change the own frequency-output reduction control pattern, when the connection point frequency measurement value exceeds the prescribed frequency upper limit value.

The control unit 440 that cannot communicate with the PCS integrated control apparatus 500 periodically executes the connection point voltage optimization processing.

Figure 12:
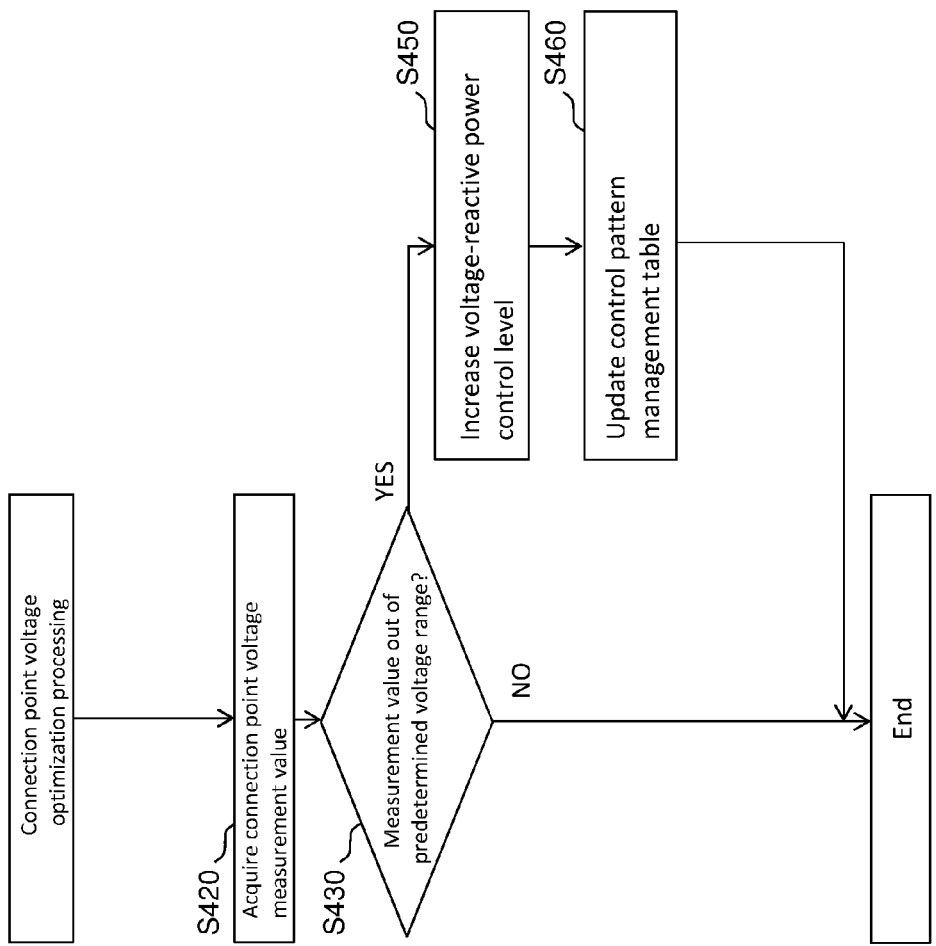
FIG. 12 illustrates connection point voltage optimization processing.

FIG. 12 illustrates the connection point voltage optimization processing.

In S420, the control unit 440 acquires the connection point voltage measurement value as the voltage measured by the sensor 430. In S430, the control unit 440 determines whether the connection point voltage measurement value is out of the prescribed voltage range.

When it is determined that the connection point voltage measurement value is within the prescribed voltage range, the control unit 440 terminates the flow.

When it is determined that the connection point voltage measurement value is out of the prescribed voltage range, in S450, the control unit 440 acquires the voltage-reactive power control level stored in the control pattern management table 460, and increments the voltage-reactive power control level by one. In this processing, when the voltage-reactive power control level stored in the control pattern management table 460 is at the voltage-reactive power control level upper limit value, the control unit 440 does not change the voltage-reactive power control level. Then, in S360, the control unit 440 writes the changed voltage-reactive power control level to the control pattern management table 460, and terminates the flow.

With the connection point voltage optimization processing described above, the PCS 400 that cannot communicate with the PCS integrated control apparatus 500 can change the voltage-reactive power control pattern when the connection point voltage measurement value falls out of the prescribed voltage range.

The PCS 400 may store a history of past data for the command received from the PCS integrated control apparatus 500, the determined control level, a power generation amount, an insolation amount, weather, temperature, and the like. In this case, in the connection point frequency optimization processing and the connection point voltage optimization processing, the control unit 440 executes statistic processing with the history of the past data, and thus determines the control level by using a control level of the preceding day, a control level of the same season, a control level of the same day of the week, a control level of the day with a similar history of the power generation amount, and the like.

With the connection point frequency optimization processing and the connection point voltage optimization processing described above, the PCS 400 that cannot communicate with the PCS integrated control apparatus 500 can perform autonomous dispersed control. Thus, the constrain on output and control on reactive power by the PCS 400 is less likely to be affected by a load on and failure in a communication path between the PCS integrated control apparatus 500 and the PCS 400.

Frequency-output reduction control performed by the PCS 400 is described below.

Figure 13:
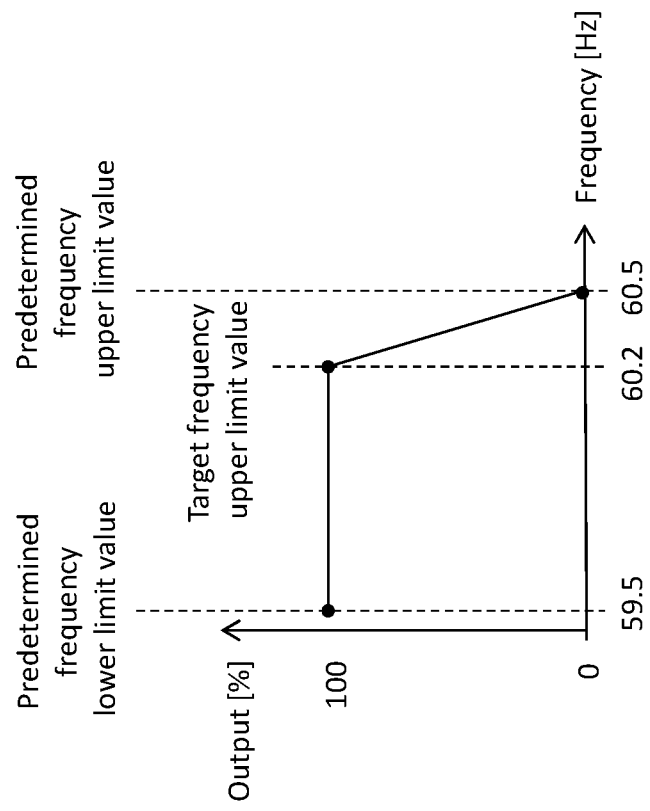
FIG. 13 illustrates an example of a frequency-output reduction control pattern.

FIG. 13 illustrates an example of the frequency-output reduction control pattern.

In the figure, the horizontal axis represents the connection point frequency measurement value and the vertical axis represents an output from the PCS 400. The output is the active power output from the PCS 400 and is illustrates as a percentage with respect to the maximum value. In this example, the frequency reference value is 60.0 Hz.

When the connection point frequency measurement value is not higher than the target frequency upper limit value, the control unit 440 does not reduce the output power from the PCS 400. Thus, the control unit 440 maintains the output from the PCS 400 at the maximum level. When the connection point frequency measurement value is higher than the target frequency upper limit value, the power is excessively supplied relative to the power demand in the power distribution system. Thus, the output power from the PCS 400 is reduced by the control unit 440 as the connection point frequency measurement value increases. By reducing the output power from the PCS 400 connected with the power distribution system, the frequency of the power distribution system can be reduced. The PCS 400 uses the target frequency upper limit value lower than the prescribed frequency upper limit value, and thus can perform the output reduction before the connection point frequency reaches the prescribed frequency upper limit value.

Here, an output reduction method in a case where the renewable energy power generation apparatus 330 is a solar power generation apparatus is described.

Figure 14:
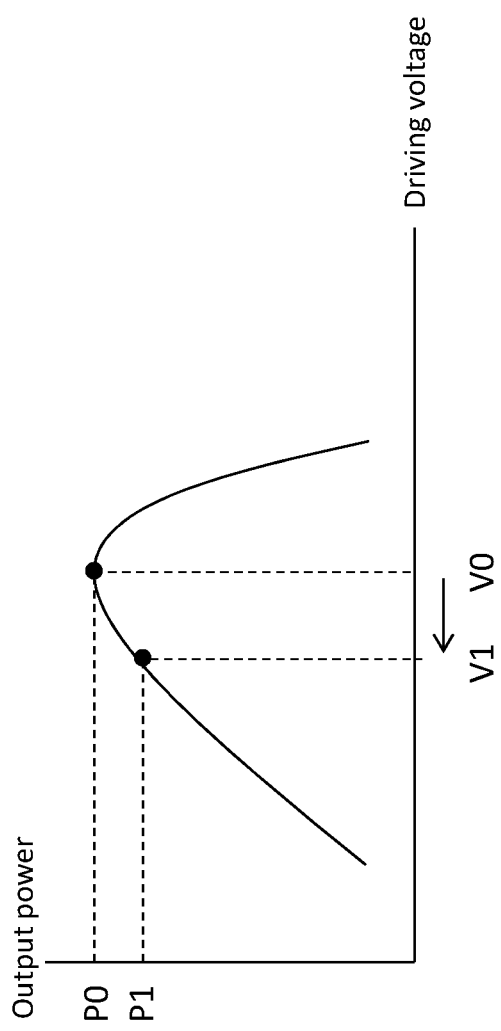
FIG. 14 illustrates P-V characteristics of a solar power generation apparatus.

FIG. 14 illustrates P-V characteristics of the solar power generation apparatus.

The characteristics indicate that the output power from the solar power generation apparatus is changed by controlling driving voltage of the solar power generation apparatus by the control unit 440 using the DC-DC converter 410. The P-V characteristics of the solar power generation apparatus include a maximum power point at which the maximum output power is achieved. The output power from the solar power generation apparatus changes in accordance with the insolation amount and the temperature. For example, the control unit 440 controls the driving voltage by using the DC-DC converter 410 through maximum power point tracking (MPPT). The MPPT is carried out with optimum driving voltage V0, achieving the maximum output power P0 as the output power, as the target. When no output reduction is executed, the control unit 440 controls the driving voltage by using the DC-DC converter 410 with the optimum driving voltage V0, achieving the maximum output power P0 as the output power, as the target. When the output reduction is executed, the control unit 440 uses the DC-DC converter 410 to reduce the driving voltage from V0 to V1, so that the output power is reduced from P0 to P1.

By thus controlling the driving voltage, the PCS 400 can reduce the output power.

Figure 15:
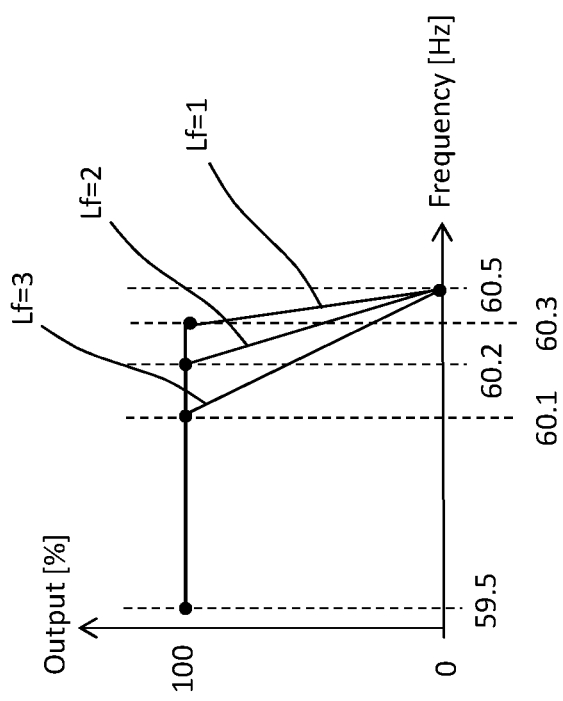
FIG. 15 illustrates a frequency-output reduction control pattern for each frequency-output reduction control level.

FIG. 15 illustrates a frequency-output reduction control pattern for each frequency-output reduction control level.

When the system frequency measurement value exceeds the prescribed frequency upper limit value, the PCS integrated control apparatus 500 increments a frequency-output reduction control level Lf by one. As the frequency-output reduction control level Lf increases, the target frequency upper limit value decreases and thus becomes closer to the frequency reference value. With a higher frequency-output reduction control level Lf increases, the PCS 400 performs the output reduction for a smaller deviation of the connection point frequency measurement value from the frequency reference value. Thus, the system frequency can be more effectively increased. The PCS 400 may calculate the target frequency upper limit value and the output power from the frequency-output reduction control level by using a predetermined formula. The PCS 400 may calculate the driving voltage from the frequency-output reduction control level.

Figure 16:
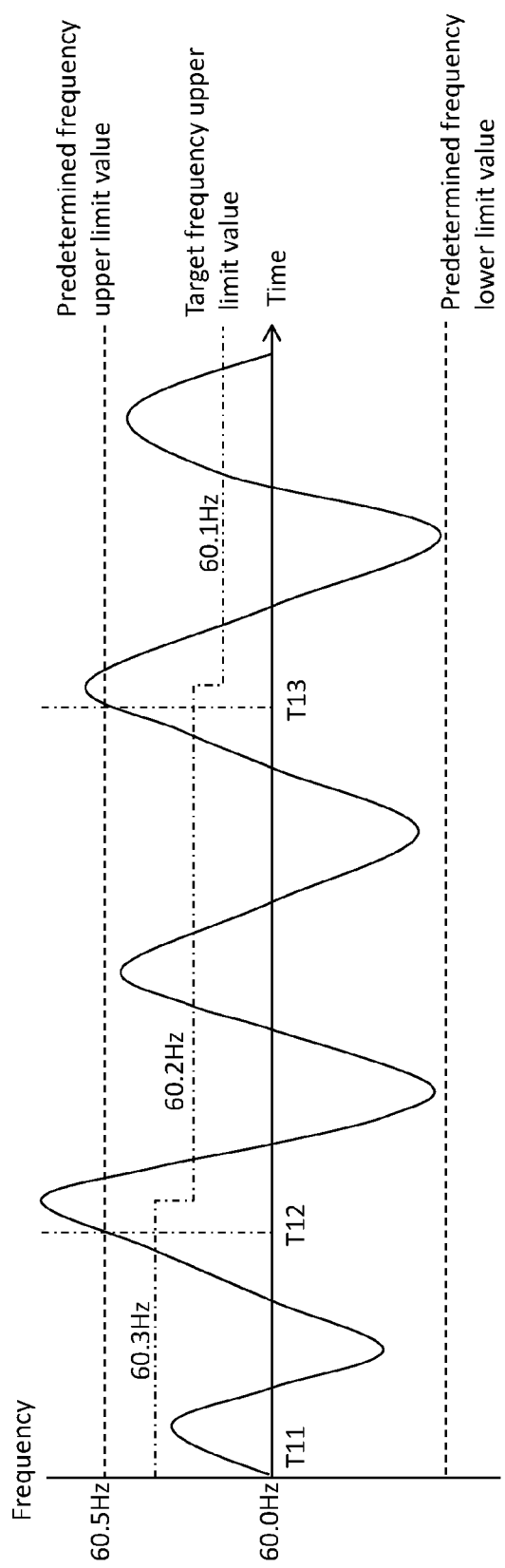
FIG. 16 illustrates how a frequency-output reduction control level is increased.

FIG. 16 illustrates how the frequency-output reduction control level is increased.

In the figure, the horizontal axis represents time and the vertical axis represents the system frequency measurement value. The frequency reference value is 60.0 Hz, and the prescribed frequency upper limit value is 60.5 Hz. At a time point T11, the frequency-output reduction control level is 1, and the target frequency upper limit value in the corresponding frequency-output reduction control pattern is 60.3 Hz. Then, at a time point T12 where the system frequency measurement value exceeds the prescribed frequency upper limit value, the PCS integrated control apparatus 500 increases the frequency-output reduction control level to 2, and transmits the frequency-output reduction control level to the PCS 400. Thus, the PCS 400 reduces the target frequency upper limit value to 60.2 Hz in accordance with the corresponding frequency-output reduction control pattern. Then, when the system frequency measurement value again exceeds the prescribed frequency upper limit value at a time point T13, the PCS integrated control apparatus 500 increases the frequency-output reduction control level to 3, and transmits the frequency-output reduction control level to the PCS 400. Thus, the PCS 400 reduces the target frequency upper limit value to 60.1 Hz in accordance with the corresponding frequency-output reduction control pattern. As described above, when the PCS 400 cannot communicate with the PCS integrated control apparatus 500 in the system frequency optimization processing, the connection point frequency measurement value is used instead of the system frequency measurement value.

With the system frequency optimization processing, the target frequency upper limit value can be prevented from sharply dropping, and thus excessive output reduction can be prevented. The output reduction leads to reduction of a power selling amount of a customer. Thus, with the system frequency optimization processing, the customer can regulate the reduction of the power selling amount with the renewable energy power generation apparatus 330. When the frequency exceeds the prescribed frequency upper limit value after the frequency-output reduction control is performed, the frequency-output reduction control level is increased and the target frequency upper limit value is further reduced, whereby the frequency can be more effectively stabilized. Thus, even though the power selling amount of the customer is largely affected, the power distribution system can be more effectively stabilized.

Figure 17:
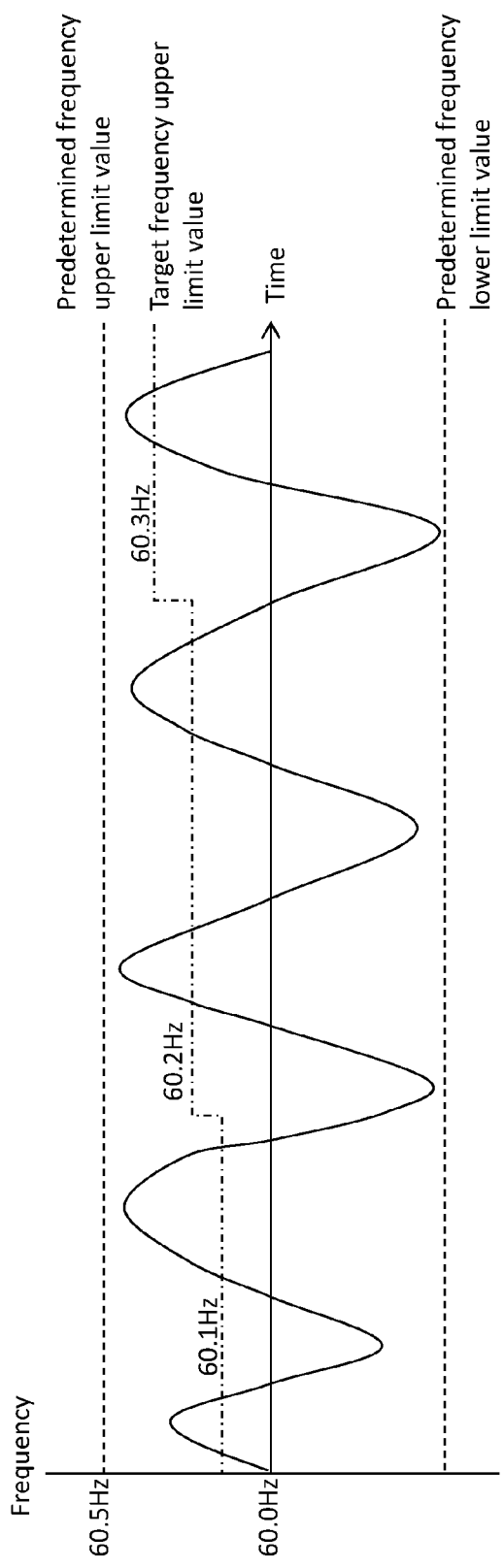
FIG. 17 illustrates how the frequency-output reduction control level is reduced.

FIG. 17 illustrates how the frequency-output reduction control level is reduced.

When a state in which the system frequency measurement value does not exceed the prescribed frequency upper limit value is maintained over a predetermined frequency restoration time period, the PCS integrated control apparatus 500 decrements the frequency-output reduction control level by one. For example, the frequency restoration time period is one day and the like, and thus is sufficiently longer than a cycle of the system frequency optimization processing. The frequency restoration time period may be set by a manager. Similarly, when the control unit 440 of the PCS 400 cannot communicate with the PCS integrated control apparatus 500 and the state where the connection point frequency measurement value does not exceed the prescribed frequency upper limit value is maintained over the frequency restoration time period, the frequency-output reduction control level is decremented by one. As described above, the PCS integrated control apparatus 500 gradually decreases the frequency-output reduction control level in a time period longer than the time for increasing the frequency-output reduction control level, whereby the frequency-output reduction control level can be prevented from immediately increasing after decreasing.

The voltage-reactive power control performed by the PCS 400 is described below.

Figure 18:
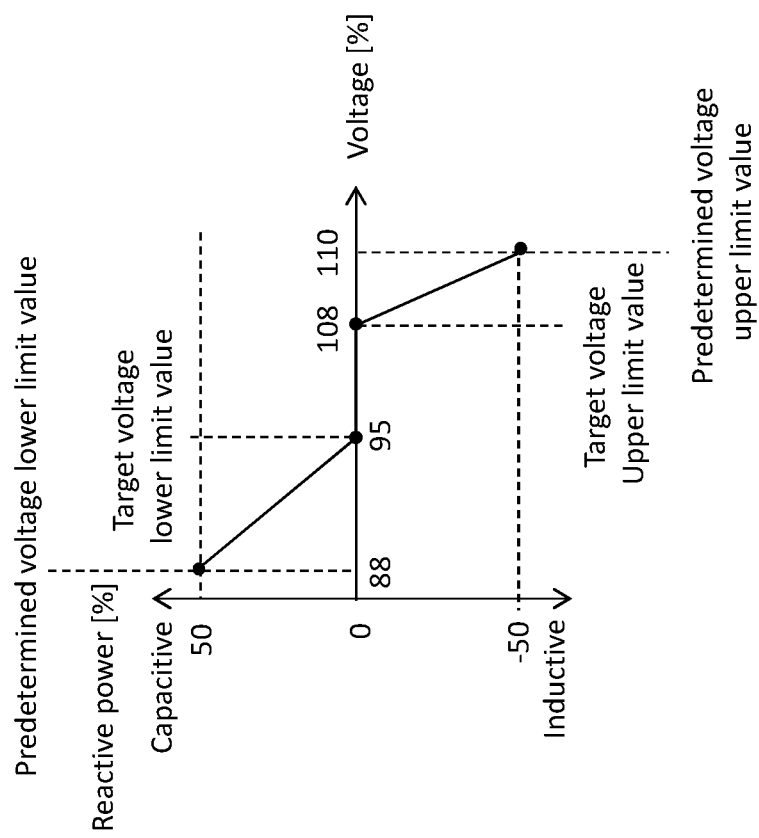
FIG. 18 illustrates an example of a voltage-reactive power control pattern.

FIG. 18 illustrates an example of the voltage-reactive power control pattern.

In the figure, the horizontal axis represents the connection point voltage measurement value and the vertical axis represents the reactive power supplied from the PCS 400 to the power distribution line 210. The reactive power is represented by a percentage with respect to the maximum value. The reactive power of a positive value is capacitive and indicates that lagging reactive power is generated. The reactive power of a negative value is inductive and indicates that the lagging reactive power is absorbed (advanced reactive power is generated). The voltage reference value in this example is represented by 100%.

When the connection point voltage measurement value is within the target voltage range, the control unit 440 does not control the reactive power of the PCS 400. When the connection point voltage measurement value is smaller than the target voltage lower limit value, the control unit 440 increases the reactive power in the positive direction as the connection point voltage measurement value decreases, and thus the lagging reactive power is generated from the DC/AC inverter 420 to the power distribution line 210. Thus, with the PCS 400, connected with the power distribution line 210, generating the lagging reactive power, the voltage of the power distribution line 210 can be raised. When the connection point voltage measurement value is larger than the target voltage upper limit value, the control unit 440 increases the reactive power in the negative direction as the connection point voltage measurement value increases, whereby the lagging reactive power is absorbed from the power distribution line 210 to the DC/AC inverter 420. With the PCS 400, connected with the power distribution line 210, absorbing the lagging reactive power, the voltage of the power distribution line 210 can be lowered. The PCS 400 uses the target voltage range smaller than the prescribed voltage range, whereby the reactive power can be controlled before the connection point voltage falls out of the prescribed range.

Now, a reactive power control method is described.

Figure 19:
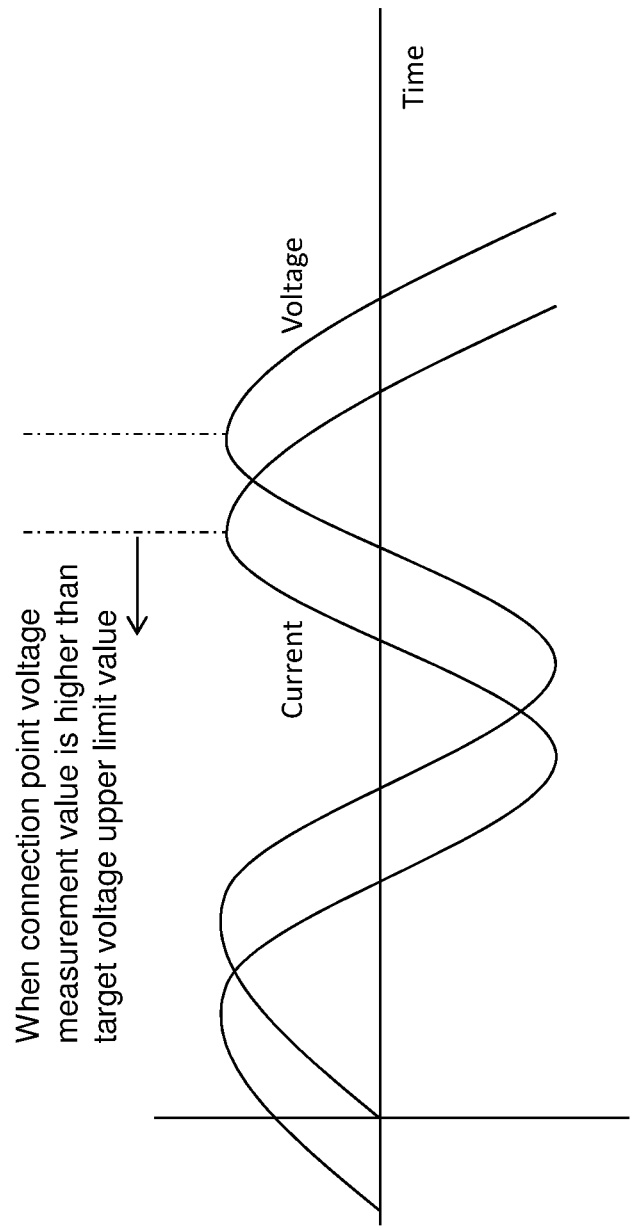
FIG. 19 illustrates how voltage and current, output from a DC/AC inverter 420, change over time.

FIG. 19 illustrates how voltage and current, output from the DC/AC inverter 420, change over time.

In the figure, the horizontal axis represents time and the vertical axis represents voltage or current. When the connection point voltage measurement value is larger than the target voltage upper limit value, the control unit 440 advances the phase of the current with respect to the voltage output from the DC/AC inverter 420, whereby the advanced reactive power is supplied to the power distribution line 210 so that the voltage of the power distribution line 210 drops. When the connection point voltage measurement value is smaller than the target voltage lower limit value, the control unit 440 makes the phase of the current lagged from the voltage output from the DC/AC inverter 420, whereby the lagging reactive power is supplied to the power distribution line 210 so that the voltage of the power distribution line 210 rises.

Figure 20:
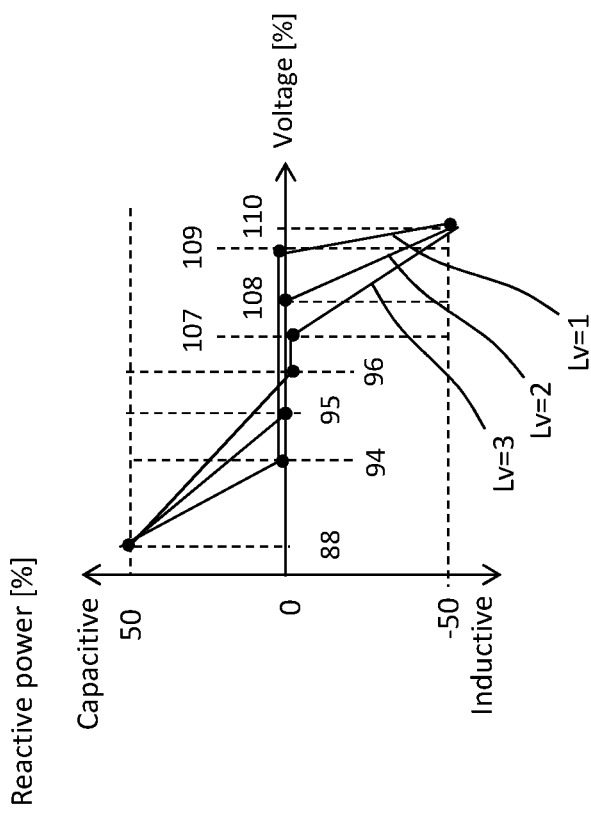
FIG. 20 illustrates a voltage-reactive power control pattern for each voltage-reactive power control level.

FIG. 20 illustrates a voltage-reactive power control pattern for each voltage-reactive power control level.

When the power distribution line voltage measurement value falls out of the prescribed voltage range, the PCS integrated control apparatus 500 increments the voltage-reactive power control level Lv by one. As the voltage-reactive power control level Lv rises, the target voltage range decreases, whereby the target voltage lower limit value and the target voltage upper limit value become closer to the voltage reference value. With higher voltage-reactive power control level Lv, the PCS 400 performs the reactive power control for smaller deviation of the connection point frequency measurement value from the frequency reference value.

Figure 21:
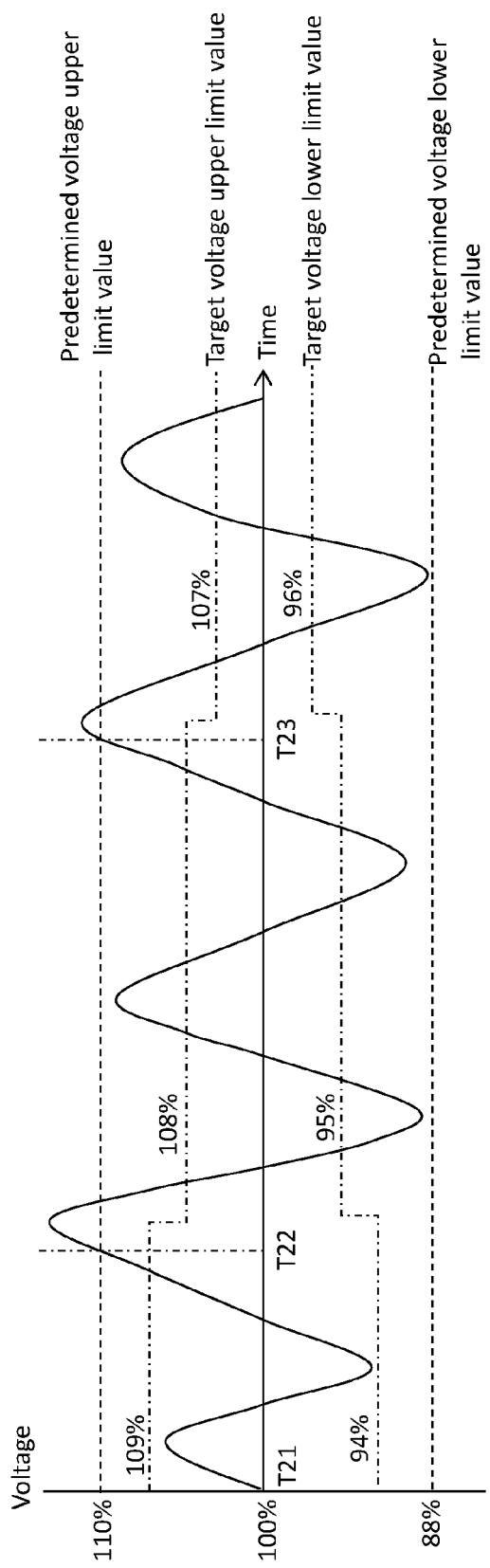
FIG. 21 illustrates how the voltage-reactive power control level is increased.

FIG. 21 illustrates how the voltage-reactive power control level is increased.

In the figure, the horizontal axis represents time and the vertical axis represents the power distribution line voltage measurement value measured by the target data collection apparatus. The prescribed voltage lower limit value is 88%, the voltage reference value is 100%, and the prescribed voltage upper limit value is 110%. At a time point T21, the voltage-reactive power control level is 1, the target voltage lower limit value and the target voltage upper limit value in the corresponding voltage-reactive power control pattern are 94% and 109%, respectively. Then, when the power distribution line voltage measurement value falls out of the prescribed voltage range at a time point T22, the PCS integrated control apparatus 500 increases the voltage-reactive power control pattern control level to 2, and transmits the voltage-reactive power control pattern control level to the PCS 400. Thus, the PCS 400 increases the target voltage lower limit value to 95% and decreases the target voltage upper limit value to 108%, in accordance with the corresponding voltage-reactive power control pattern. Then, when the power distribution line voltage measurement value falls out of the prescribed voltage range again at a time point T23, the PCS integrated control apparatus 500 increases the voltage-reactive power control pattern control level to 3, and transmits the voltage-reactive power control pattern control level to the PCS 400. Thus, the PCS 400 increases the target voltage lower limit value to 96% and decreases the target voltage upper limit value to 107% in accordance with the corresponding voltage-reactive power control pattern. As described above, in the power distribution line voltage optimization processing, when the PCS 400 cannot communicate with the PCS integrated control apparatus 500, the connection point voltage measurement value is used instead of the power distribution line voltage measurement value.

With the power distribution line voltage optimization processing, the target voltage range can be prevented from rapidly decreasing and the reactive power can be prevented from being excessively supplied. When the voltage falls out of the prescribed voltage range after the voltage-reactive power control is performed, the voltage-reactive power control level is increased to further reduce the target voltage range. Thus, the power distribution line voltage can be more effectively stabilized.

Figure 22:
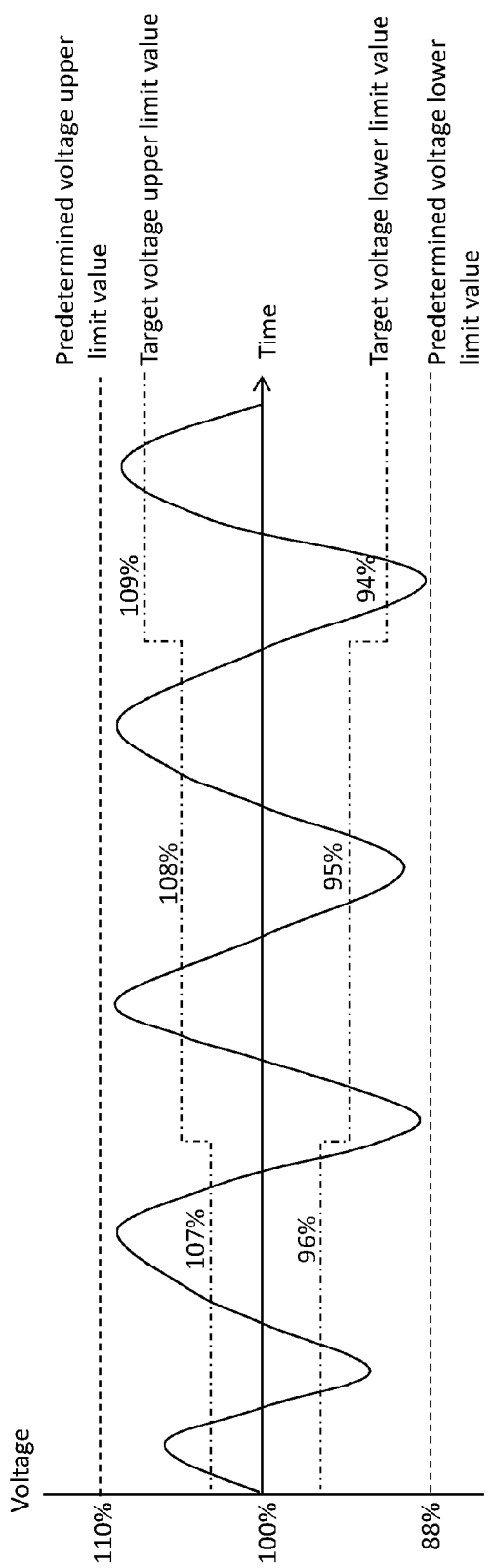
FIG. 22 illustrates how the voltage-reactive power control level is reduced.

FIG. 22 illustrates how the voltage-reactive power control level is reduced.

When the state where the power distribution line voltage measurement value stays within the prescribed voltage range is maintained over a predetermined voltage restoration time period, the optimization unit 520 of the PCS integrated control apparatus 500 reduces the voltage-reactive power control level. The voltage restoration time period is several hours for example, and thus is sufficiently longer than a cycle of the power distribution line voltage optimization processing, and is shorter than the frequency restoration time period. The voltage restoration time period may be set by the manager. Similarly, when the communication with the PCS integrated control apparatus 500 cannot be established and the state where the connection point voltage measurement value stays within the prescribed voltage range is maintained over the voltage restoration time period, the control unit 440 of the PCS 400 decrements the voltage-reactive power control level by one. As described above, the PCS integrated control apparatus 500 gradually decreases the voltage-reactive power control level in a time period longer than the time for increasing the voltage-reactive power control level, whereby the voltage-reactive power control level can be prevented from immediately increasing after decreasing.

The frequency restoration time period and the voltage restoration time period may be set based on the scale of the PCS 400. For example, the large scale PCS 400 avoids a change in the control level in a short period of time as such a change largely affects the power distribution system and the power distribution line 210.

The technique described in the embodiment can be expressed as follows.

(Expression 1)

A control apparatus controlling a plurality of power conversion apparatuses each connected with an electrical grid, converting DC power from a power source into AC power, and transmitting the AC power to the electrical grid, the control apparatus including:

a communication unit configured to repeatedly receive a system frequency as a frequency of power measured in the electrical grid, and a determination unit configured to determine based on the system frequency an active power control level indicating a level of control for active power output to the electrical grid by each power conversion apparatus, wherein the communication unit is configured to transmit the active power control level to the plurality of power conversion apparatuses, each power conversion apparatus is configured to store active power relationship information indicating a relationship between the active power control level and a connection point frequency as a frequency at a connection point to the electrical grid, repeatedly measure the connection point frequency, receive the active power control level from the control apparatus, and control the active power based on the measured connection point frequency, the received active power control level, and the active power relationship information.

Terms for describing the present invention are described. The power distribution system and the like may be used as an electrical grid. The renewable energy power generation apparatus 330 and the like may be used as a power source. The PCS 400 and the like may be used as a power conversion apparatus. The PCS integrated control apparatus 500 and the like may be used as a control apparatus. The control pattern management table 460 and the like may be used as active power relationship information. The control pattern management table 460 and the like may be used as reactive power relationship information. The frequency-output reduction control level and the like may be used as an active power control level. The voltage-reactive power control level and the like may be used as a reactive power control level. The system frequency measurement value and the like may be used as a system frequency. The power distribution line voltage measurement value and the like may be used as power distribution line voltage. The connection point frequency measurement value and the like may be used as a connection point frequency. The connection point voltage measurement value and the like may be used as connection point voltage. The control pattern management table 460 and the like may be used as a storage unit. The sensor 430 and the like may be used as a measurement unit. The communication unit 450 and the like may be used as a communication unit in the power conversion apparatus. The DC/DC converter 410 and the like may be used as a DC/DC conversion unit. The DC/AC inverter 420 and the like may be used as a DC/AC conversion unit. The communication unit 510 may be used as a communication unit in the control apparatus. An optimization unit 520 and the like may be used as a determination unit.

The present invention is not limited to the embodiment described above, and may be modified in various ways without departing from the gist of the present invention.

What is claimed is:

1. An electrical grid control system comprising:
   a power distribution substation;
   a plurality of customer facilities each including a load consuming power;
   a plurality of power distribution lines of a an electrical gird connecting the plurality of customer facilities with the power distribution substation;
   a plurality of data measurement sensors respectively provided on each power distribution line that measure a system voltage and a system frequency,
   wherein each customer facility includes a distribution board, a power conversion apparatus, a renewable energy power generation apparatus, and a respective load,
   wherein each respective distribution board is connected to a respective power distribution line and supplies power from the power distribution line to the load and power from the power conversion apparatus to the power distribution line,
   wherein the renewable energy power generation apparatus generates DC power and the power conversion apparatus converts the DC power from the renewable energy power generation apparatus into AC power and outputs the AC active power to the grid,
   wherein each data collection apparatus and each power conversion apparatus is connected to an integrated controller,
   wherein the integrated controller includes a memory coupled to a processor, the memory storing instructions that when executed configure the processor to:
   repeatedly receive information indicating a system frequency measured in the electrical grid, determine an active power control level based on the system frequency, and transmit the active power control level to the plurality of power conversion apparatuses,
   wherein each power conversion apparatus includes a memory coupled to a processor, the memory storing instructions that when executed configure the processor to:
   store active power relationship information indicating a relationship between the active power control level representing a level of control for active power outputted to the electrical grid and a connection point frequency being a frequency at a connection point to the electrical grid, and repeatedly measure the connection point frequency, receive the active power control level from the control apparatus, and adjust the active power based on the measured connection point frequency, the received active power control level, and the active power relationship information.

2. The electrical grid control system according to claim 1, wherein
each power conversion apparatus is connected with one of the plurality of power distribution lines, and is configured to store reactive power relationship information indicating a relationship between a reactive power control level indicating a level of control on the reactive power outputted to the electrical grid, and a connection point voltage being voltage at the connection point,
for each power distribution line, the control apparatus is configured to repeatedly receive information indicating power distribution line voltage being voltage of the power distribution line and measured by the data measurement sensor corresponding to the power distribution line, determine a reactive power control level of the power conversion apparatus connected with the power distribution line based on the power distribution line voltage, and transmit the reactive power control level to the power conversion apparatus, and
each power conversion apparatus is configured to repeatedly measure the connection point voltage, receive the reactive power control level from the control apparatus, and adjust the reactive power based on the measured connection point voltage, the received reactive power control level, and the reactive power relationship information.

3. The electrical grid control system according to claim 2, wherein
the active power relationship information includes a relationship between the active power control level and a target frequency upper limit value being an upper limit of a target range of the connection point frequency, and
the power conversion apparatus determines the target frequency upper limit value based on the received active power control level and the active power relationship information, determines whether the connection point frequency exceeds the target frequency upper limit value, and reduces the active power in accordance with the connection point frequency, upon determining that the connection point frequency exceeds the target frequency upper limit value.

4. The electrical grid control system according to claim 3, wherein
the reactive power relationship information includes a relationship between the reactive power control level and a target voltage range being a target range of the connection point voltage, and
the power conversion apparatus determines the target voltage range based on the received reactive power control level and the reactive power relationship information, determines whether the connection point voltage is out of the target voltage range, and increases the reactive power in accordance with the connection point voltage, upon determining that the connection point voltage is out of the target voltage range.

5. The electrical grid control system according to claim 4, wherein
the control apparatus determines whether the system frequency exceeds a prescribed frequency upper limit value set in advance, and increases the active power control level, upon determining that the system frequency exceeds the prescribed frequency upper limit value, and
the power conversion apparatus reduces the target frequency upper limit value, upon receiving the increased active power control level.

6. The electrical grid control system according to claim 5, wherein
the control apparatus determines whether the power distribution line voltage is out of a prescribed voltage range set in advance, and increases the reactive power control level, upon determining that the power distribution line voltage is out of the prescribed voltage range, and
the power conversion apparatus narrows the target voltage range, upon receiving the increased reactive power control level.

7. The electrical grid control system according to claim 6, wherein
the target frequency upper limit value is lower than the prescribed frequency upper limit value,
a lower limit of the target voltage range is higher than a lower limit of the prescribed voltage range, and
an upper limit of the target voltage range is lower than an upper limit of the prescribed voltage range.

8. The electrical grid control system according to claim 2, wherein the control apparatus causes a display apparatus to display the active power control level and the reactive power control level transmitted to each power conversion apparatus.

9. The electrical grid control system according to claim 1, wherein
each power conversion apparatus is configured to determine whether communication is able to be established with the control apparatus, selects an active power control level based on the measured connection point frequency, upon determining that the communication is not able to be established with the control apparatus, and controls the active power based on the measured connection point frequency, the selected active power control level, and the active power relationship information.

10. The electrical grid control system according to claim 9, wherein
each power conversion apparatus is configured to determine whether communication is able to be established with the control apparatus, selects a reactive power control level based on the measured connection point voltage, upon determining that the communication is not able to be established with the control apparatus, and controls the reactive power based on the measured connection point voltage, the selected reactive power control level, and the reactive power relationship information.

11. An electrical grid control method of controlling an electric grid control system including, a power distribution substation; a plurality of customer facilities each including a load consuming power; a plurality of power distribution lines of a an electrical gird connecting the plurality of customer facilities with the power distribution substation; a plurality of data measurement sensors respectively provided on each power distribution line that measure a system voltage and a system frequency, wherein each customer facility includes a distribution board, a power conversion apparatus including a controller, a renewable energy power generation apparatus, and a respective load, wherein each respective distribution board is connected to a respective power distribution line and supplies power from the power distribution line to the load and power from the power conversion apparatus to the power distribution line, wherein the renewable energy power generation apparatus generates DC power, and wherein each data collection apparatus and each power conversion apparatus is connected to an integrated controller, the method comprising:

converting, using each of a plurality of power conversion apparatuses connected with an electrical grid, DC power from a renewable energy source into AC power;

outputting, using each power conversion apparatus, the AC active power to the electrical grid;

storing, using each power conversion apparatus, active power relationship information indicating a relationship between an active power control level indicating a level of control on active power output to the electrical grid, and a connection point frequency being a frequency at a connection point to the electrical grid;

repeatedly receiving, using the integrated controller, information indicating a system frequency being a frequency of power measured in the electrical grid;

determining, using the control apparatus, the active power control level based on the system frequency;

transmitting, using the control apparatus, the active power control level to the plurality of power conversion apparatuses;

repeatedly measuring, using each power conversion apparatus, the connection point frequency;

receiving, using each power conversion apparatus, the active power control level from the control apparatus; and adjust, using each power conversion apparatus, the active power based on the measured connection point frequency, the received active power control level, and the active power relationship information.

* * * * *